June 7, 1960

K. J. HARRIS 2,939,344

DRIVE MECHANISM

Filed May 1, 1957

INVENTOR.
K. J. HARRIS

June 7, 1960 K. J. HARRIS 2,939,344
DRIVE MECHANISM
Filed May 1, 1957 2 Sheets-Sheet 2

INVENTOR.
K. J. HARRIS

United States Patent Office 2,939,344
Patented June 7, 1960

2,939,344

DRIVE MECHANISM

Kenneth J. Harris, Waterloo, Iowa, assignor, by mesne assignments, to Deere & Company, a corporation of Delaware Filed May 1, 1957, Ser. No. 656,245

7 Claims. (Cl. 74—768)

This invention relates to a drive mechanism and more particularly to a power wheel unit incorporating the drive mechanism and especially provided for furnishing traction power to a variety of different types of vehicles.

The invention finds its greatest utility in the agricultural and industrial fields, primarily in the adaptation of various machines and implements to self-propelled units. For example, a frame may be equipped with one or more of the inventive units and this frame may be especially designed to carry a certain type of implement. Therefore, it is a principal object of the invention to provide the unit in the form of a compact housing adapted for attachment to a suitable supporting frame. The invention features also a compact driving arrangement incorporated in the housing and including a multi-ratio drive mechanism capable of receiving power from a relatively remote source. It is a further object of the invention to provide a housing having substantial bearing supports for the components of the drive and the ultimate traction wheel or equivalent output member.

The foregoing and other important objects and desirable features inherent in and encompassed by the invention will become apparent as a preferred embodiment of the invention is disclosed in detail in the ensuing specification and accompanying sheets of drawings, the several figures of which will be described immediately below.

Figure 1:
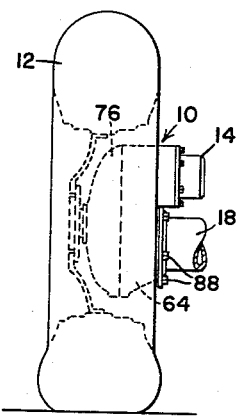
Fig. 1 is an elevation of the unit as associated with a traction wheel.
Figure 2:
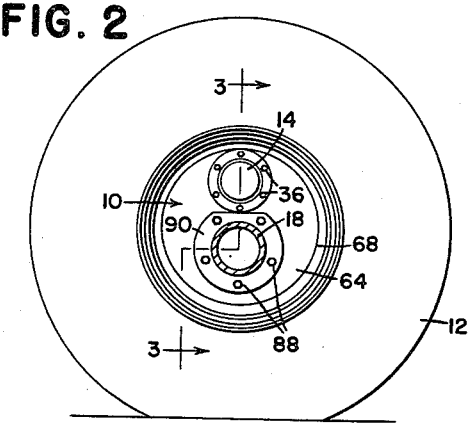
Fig. 2 is a side view of the same.

The power wheel unit comprises a gear housing 10, a traction wheel 12, input means 14 and mounting means 16 for connection to a suitable support as at 18. The gear housing comprises peripheral wall means 20 and inner and outer coaxially spaced apart end walls 22 and 24 respectively coaxially apertured at 26 and 28. This structure affords a first or upper compartment 30. The end wall 22, by way of its aperture 26, mounts or carries an inner bearing support 32 and a generally similar outer bearing support 34 is carried by the other end wall 24. The bearing support 32 is rigidly secured to the gear housing 10 as by a plurality of cap screws 36 which pass through a flange 38 on the input means 14. This means may be a hydraulic motor of any suitable type, powered as by an internal combustion engine (not shown) or other source. Cap screws 40 may be used to secure the bearing support 34 to the other end wall 24.

The bearing support 32 has a coaxially inwardly extending hub 42 which affords internal and external concentric bearing surfaces 44 and 46, the inner surface serving to support a typical anti-friction bearing 48 and the outer surface mounting a suitable sleeve bearing 50.

The other bearing support has an axially inwardly extending hub 52 which has inner and outer bearing surfaces 54 and 56. A suitable sleeve bearing 58 surrounds the surface 56 and an anti-friction bearing 60 of the roller type is encircled by the inner bearing surface 54. The rollers of the bearing 60 are retained by a typical snap ring 62.

Figure 3:
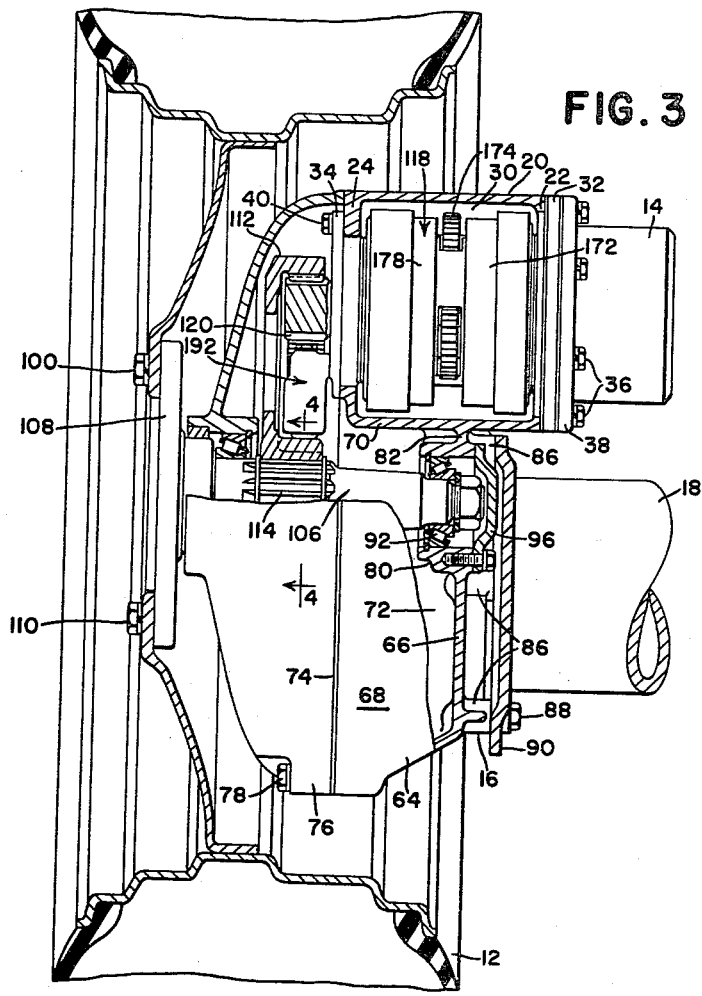
Fig. 3 is an enlarged section taken substantially on the line 3—3 of Fig. 2.
Figure 5:
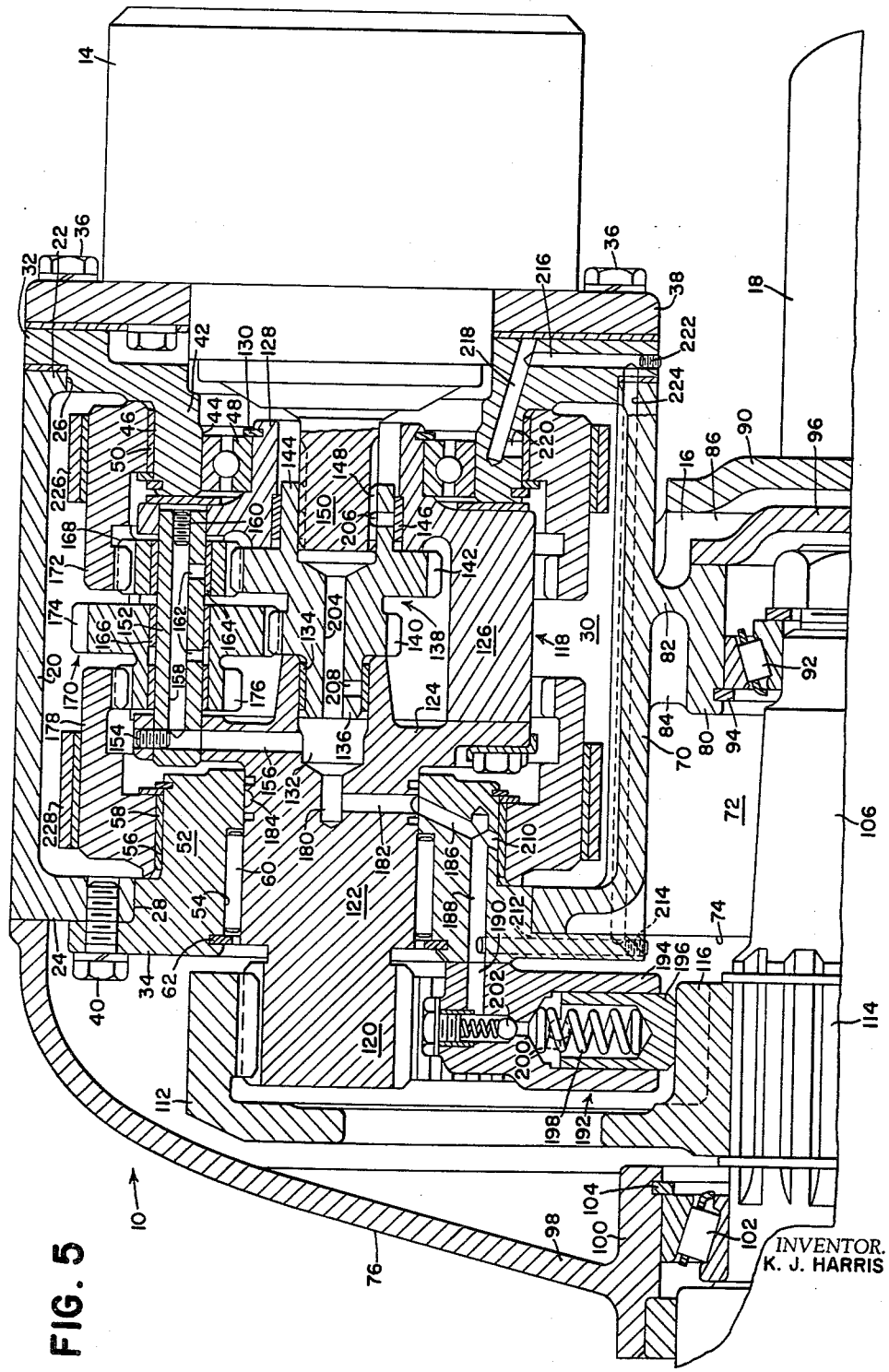
Fig. 5 is an enlarged section showing the major portions of the drive mechanism.

The gear housing 10 includes, preferably as an integral part thereof or otherwise rigidly secured thereto, a shell housing portion 64, extending radially from, here in depending relation to, the upper portion of the housing and having an inner radial wall 66 and a peripheral wall 68 that is preferably integral with the peripheral wall means 20 that forms the upper compartment 30. As best seen in Figs. 3 and 5, part of the peripheral wall means 20, as at 70, affords a partition between the upper compartment 30 and a lower compartment 72 that is formed by the shell housing 64. The peripheral wall 68 has an outer marginal edge 74 coplanar with the outer surface of the outer wall 24 of the compartment 30, and a cover housing 76 complements the upper housing and the shell housing portion and is secured to the marginal edge 74, as by a plurality of cap screws 78 and closes the two compartments 30 and 72. When the cover housing is removed, the compartment 72 opens outwardly in eccentric relationship to the outer opening 28 for the compartment 30.

The radial wall 66 of the shell housing 64 is provided with a bearing support 80 that is rigidly united to the peripheral wall means partition 70 as by an intermediate portion 82 of the radial wall means 66. The junction between the partition 70 and the bearing support 80 is suitably webbed at 84 to afford strength, and additional strength is provided by the integral casting with the external portion of the bearing support of part of the mounting means 16, which is here shown as a pad having a plurality of bosses 86 for receiving cap screws 88 passed through a flange 90 integral with the support 18. The bearing support 80 is of course eccentric to the compartment 30, being located in the compartment 72 and facing outwardly to afford an inner cylindrical recess for mounting a tapered roller bearing 92 which is retained by a snap ring 94. The bearing is capped at its other side at 96.

The cover housing 76 has an outer wall portion 98 which provides a bearing support 100 coaxial with the bearing support 80. This bearing support internally mounts a second tapered roller bearing 102 which is retained by a snap ring 104. The bearings 92 and 102 thus afford coaxial inner and outer bearings which journal or mount a transverse wheel shaft 106, the outer end portion of which has a wheel-mounting flange 108 to which the wheel 12 is coaxially secured as by cap screws 110. The shaft or axle 106 carries within the cover housing 76 a drive gear 112 of the internal-toothed type, the shaft being splined at 114 to receive the hub 116 of the gear 112. The diameter of the gear 112 is such that it radially overlaps but is outside of the compartment 30. This compartment contains drive gearing 118 having a pinion 120 in constant mesh with the internal drive gear 112.

The drive gearing 118 is of the dual planetary type and the pinion 120 is preferably integral with a shaft portion 122 of a first or outer carrier element 124. The shaft portion 122 is journaled in the previously described roller bearing means 60 in the outer bearing support 34. The pinion 20 is outwardly of the bearing support and the carrier portion 124 is inwardly of the bearing support, and the bearing means 60 is of adequate width to properly journal the carrier element. The carrier portion 124 is rigidly secured or cross-connected to a second carrier portion 126 which has a hollow shaft or hub portion 128 journaled in the inner bearing support 32 by means of the ball bearing 48. A snap ring

3

130 is carried by the hub or shaft and retains the bearing 48. The carrier structure 124—126 is thus journaled at its portions 122 and 128 respectively in the outer and inner bearings 60 and 48, and bridges the coaxially spaced apart hubs 42 and 52 of the inner and outer bearing supports 32 and 34. The carrier portion or half 124 is coaxially bored or recessed at 132 and carries a sleeve bearing 134 for journaling the outer hub 136 of a double sun gear element or cluster 138, which is made up of a small sun gear 140 and a larger sun gear 142. The latter has an inwardly extending hollow hub 144 which is journaled by a sleeve bearing 146 in the hollow carrier shaft 128. The hub 144 is internally splined at 148 to receive an input shaft 150 which is part of the input means 14.

Part of the cross-connecting means between the two carrier portions 124 and 128 comprises a plurality of planet pinion shafts, only one of which appears at 152. This shaft is appropriately mounted at its opposite ends in the carrier portions and at its outer end is fixed to the carrier portion 124 by means of a set screw 154 which serves also to plug the radially outermost end of a drilled passage 156 which leads at its inner end to the bore or recess 132. The shaft 152 is hollow to afford an axial passage 158 which is plugged at its opposite end by a set screw 160 and which has communicating radial passages 162 for supplying lubricant to bearings 164 and 166 for a planet pinion 168 and a planet pinion cluster 170. The planet pinion 168 is in constant mesh with the large sun gear 142 and is further in mesh with a ring gear element 172 which is journaled on the bearing 50 on the inner bearing support 32. The pinion cluster 170 comprises a large pinion 174, in constant mesh with the small sun gear 140, and an integral smaller planet pinion 176 which is in constant mesh with a second ring gear 178 that is journaled on the bearing 58 on the outer bearing support 34.

Figure 4:
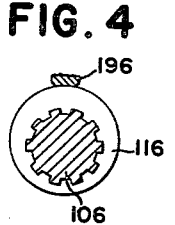
Fig. 4 is a section on the line 4—4 of Fig. 3.

The carrier shaft 122 is drilled at 180, coaxially with the bore 132, and is radially drilled at 182 for communication with an annular oil groove 184. The hub 52 of the outer bearing support 34 is drilled at 186 and 188 to afford passage means in communication with a passage 190 in a lubricant pump 192. This pump is preferably rigidly carried by the outer portion of the outer bearing support 34 and comprises an upright housing 194, radial to the shaft or axle 106 and carrying a piston 196 which is reciprocated by the hub 116 of the sun gear 112, which hub is eccentric as best shown in Fig. 4. The piston 196 acts against a spring 198 to take in oil through a port 200 and to expel oil past a spring-loaded check valve 202 to the passage 190. This oil ultimately travels through the passages 188 and 186 to the annular groove 184 for lubricating the bearing means 60. Oil also travels through the passages 182 and 180 to the recess 132 and thence through the passage 156 to the planet pinion shaft passage 158 and radial ports 162 to the planet pinion bearings 164 and 166.

Lubricant also travels through an axial passage 204 in the sun gear cluster 138, ultimately reaching the sun gear bearing 146 via the splined connection 148 and a lubricant port means 206. A port 208 communicates with the axial passage 204 for supplying lubricant to the other sun gear bearing 134. It should be noted also that the passage 186 communicates at 210 with the bearing 58 for the ring gear 178.

The outer bearing support 34 is radially drilled at 212, leading at one end to the cross passage 190 and being plugged at its other end at 214. The inner bearing support 32 is drilled at 216 and 218 to lead via a port 220 to the bearing 50. The drill 216 is plugged at its outer end at 222 and a cross passage 224 interconnects the bores or drills 212 and 216.

It will be seen from the foregoing description that the arrangement is not only compact and affords ideal bearings for the driving mechanism but also incorporates

4 passages by means of which lubricant under pressure may be supplied to the vital bearing surfaces. It will be noted that the shafts are interpiloted as respects each other and the components of the planetary gearing are interjournaled one on the other in order to accomplish compactness and adequate bearing support. The cover housing 76 may be removed to expose the pinion and large gear without disturbing the bearing support for the planetary unit. The proximity of the inner bearing for the shaft 106 to the upper compartment structure, in addition to the webbing thereof to that structure, affords a rugged inner bearing for the output shaft.

The dual-range characteristics of the gearing 118 are achieved by a pair of control bands 226 and 228 which respectively encircle the ring gear elements 172 and 178. These bands may be controlled in any suitable manner for selective tightening and loosening to lock either of the ring gear elements.

For example, with both bands relaxed, the planetary system will be idle as respects the transmission of power to the pinion 120, the source of power being of course the shaft 150 of the input means 14. If the band 226 is tightened on its ring gear element 172, that ring gear element is immobilized and the planetary system drives through the sun gear 142 and pinion 168 to turn the carrier 124—126 and hence to turn the pinion 120 at the ratio established by the reduction at 142—168—172. When the band 226 is released and the band 228 is tightened, a different output ratio is obtained, the drive in this case being from the sun gear 140, to the planet pinion cluster 170 to turn the carrier 124—126. Because of the difference in size of the planet pinions 174 and 176 an additional reduction is obtained between the sun gear 140 and the carrier. Hence, the planetary system, as already indicated, is of the dual-ratio type and whichever of the ratios is effective, according to which band is tightened, is added to that between the pinion 120 and the output gear 112.

Various features of the invention, together with objects previously outlined, have been emphasized in the foregoing description. Features other than those so enumerated will undoubtedly occur to those versed in the art, as will many modifications and alterations of the preferred embodiment disclosed, all of which may be achieved without departure from the spirit and scope of the invention.

What is claimed is:

1. A power wheel unit, comprising: a gear housing having peripheral wall means and inner and outer coaxially spaced apart apertured end walls forming a first compartment; inner and outer bearing supports rigidly carried respectively by the inner and outer end walls and apertured coaxially to afford internal bearing surfaces; each support having a concentric hub projecting into said compartment and affording an external bearing surface, said hubs being coaxially spaced apart; a shell housing rigidly joined to and extending radially as respects the gear housing and having an inner radial wall and a peripheral wall joined to said radial wall and to said gear housing, said peripheral wall of the shell housing having an outer marginal edge lying in a plane radial to the gear housing and defining an enlarged opening eccentric to the gear housing; outwardly facing inner bearing means on said radial wall eccentric and adjacent to the gear housing; a cover housing complementing both the shell and gear housings and secured to the shell housing marginal edge and to the gear housing outer end wall, said cover housing forming a second compartment with the shell housing and having a wall portion spaced axially outwardly from the outer bearing support, and said cover housing having an aperture therethrough coaxial with the inner bearing means; outer bearing means on the cover housing coaxial with the cover housing aperture; a shaft journaled in the inner and outer bearing means and extending through the cover housing aperture;

a drive gear fixed to the shaft in the second compartment and extending radially into the space between the gear housing outer end wall and the aforesaid cover housing wall portion; wheel means fixed to the shaft outside the cover housing; drive gearing in the gear housing including first and second elements journaled respectively on the external bearing surfaces and a third element cooperative with the first and second elements and journaled in the internal bearing surfaces, said third element extending outwardly through the outer bearing support as a drive portion; and a drive pinion fixed to said drive portion and meshing with the drive gear.

2. The invention defined in claim 1, including: power input means mounted on the gear housing at the exterior side of the inner bearing support and having an input connection extending through the inner bearing support aperture to the drive gearing.

3. The invention defined in claim 2, including: a mounting portion on the exterior side of the shell housing radial wall and eccentric to the input means and lying in a plane normal to the axis of the drive shaft; and a vehicle-support member secured to said mounting portion.

4. The invention defined in claim 1, in which: said second compartment is adapted to contain lubricant; the outer bearing support includes a lubricant passage therein and certain of said elements of the drive gearing having passage means communicating with said passage; and said second compartment includes a lubricant pump driven from said shaft and connected to the passage.

5. A power wheel unit, comprising: a gear housing having peripheral wall means and inner and outer coaxially spaced apart apertured end walls forming a first compartment; inner and outer bearing supports rigidly carried respectively by the inner and outer end walls and apertured coaxially to afford internal bearing surfaces, each support having a concentric hub projecting into said compartment and affording an external bearing surface, said hubs being coaxially spaced apart; a shell housing rigidly joined to and extending radially as respects the gear housing and having an inner radial wall and a peripheral wall joined to said radial wall and to said gear housing, said peripheral wall of the shell housing having an outer marginal edge lying in a plane radial to the gear housing and defining an enlarged opening eccentric to the gear housing; outwardly facing inner bearing means on said radial wall eccentric and adjacent to the gear housing; a cover housing complementing both the shell and gear housings and secured to the shell housing marginal edge and to the gear housing outer end wall, said cover housing forming a second compartment with the shell housing and having a wall portion spaced axially outwardly from the outer bearing support, and said cover housing having an aperture therethrough coaxial with the inner bearing means; outer bearing means on the cover housing coaxial with the cover housing aperture; a shaft journaled in the inner and outer bearing means and extending through the cover housing aperture; a drive gear fixed to the shaft in the second compartment and extending radially into the space between the gear housing outer end wall and the aforesaid cover housing wall portion; wheel means fixed to the shaft outside the cover housing; planetary drive gearing in the first compartment including inner and outer ring gears journaled respectively on the outer bearing surfaces, an axially hollow planet carrier axially intermediate the hubs and having planet gears meshing with the ring gears, an output extension shaft coaxially fixed to the carrier and journaled in the outer internal bearing surface and projecting through the outer bearing support as a pinion in mesh with the drive gear, an inner coaxial hollow shaft extension journaled in the inner internal bearing surface; sun gears journaled coaxially in the hollow carrier and meshing with the planet gears; and input means external to the gear housing and including an axial input connection extending through the inner bearing support aperture and through the hollow inner shaft extension to the sun gears.

6. A power wheel unit, comprising: a gear housing having peripheral wall means and inner and outer coaxially spaced apart apertured end walls forming a first compartment; inner and outer bearing supports rigidly carried respectively by the inner and outer end walls and apertured coaxially to afford internal bearing surfaces, each support having a concentric hub projecting into said compartment and affording an external bearing surface, said hubs being coaxially spaced apart; a second housing rigidly joined to and extending radially as respects the gear housing and forming a second compartment eccentric to the gear housing; a drive shaft in the second compartment, journaled in the second housing and projecting exteriorly thereof; wheel means connected to the shaft exteriorly of the housings; a drive gear fixed to the shaft within the second compartment and extending radially toward the gear housing adjacent to the outer bearing support; planetary drive gearing in the first compartment including inner and outer ring gears journaled respectively on the outer bearing surfaces, an axially hollow planet carrier axially intermediate the hubs and having planet gears meshing with the ring gears, an output extension shaft coaxially fixed to the carrier and journaled in the outer internal bearing surface and projecting through the outer bearing support as a pinion in mesh with the drive gear, an inner coaxial hollow shaft extension journaled in the inner internal bearing surface, sun gears journaled coaxially in the hollow carrier and meshing with the planet gears; and input means external to the gear housing and including an axial input connection extending through the inner bearing support aperture and through the hollow inner shaft extension to the sun gears.

7. A power wheel unit, comprising: a gear housing having peripheral wall means and inner and outer coaxially spaced apart end walls forming a first compartment, said outer wall having an axial aperture therethrough; drive means carried within the compartment and having a shaft projecting through said aperture; a pinion on said shaft exteriorly of said outer end wall; a shell housing rigidly joined to and extending radially from the gear housing to form a second compartment separate from the first compartment and having one side opening axially outwardly; a cover housing overlying both the shell housing and the gear housing and closing the open side of the second compartment and spaced axially outwardly from the outer wall of said gear housing; a shaft in the shell housing parallel to the axis of the gear housing shaft and extending into the second compartment; and a drive gear in said second compartment and keyed to said second compartment shaft and extending radially into the space between the cover housing and the outer wall of the gear housing and meshing with the pinion.

References Cited in the file of this patent

UNITED STATES PATENTS

| | | |
|---|---|---|
| 1,150,777 | Leavitt | Aug. 17, 1915 |
| 1,514,601 | Brown | Nov. 11, 1924 |
| 1,604,401 | Fisher | Oct. 26, 1926 |
| 1,872,541 | White | Aug. 16, 1932 |
| 1,919,924 | Blakeslee | July 25, 1933 |
| 2,143,115 | Stewart | June 10, 1939 |
| 2,200,566 | Szekely | May 14, 1940 |
| 2,259,071 | Lyon | Oct. 14, 1941 |
| 2,675,096 | Hetmann | Apr. 13, 1954 |
| 2,737,064 | Stoekicht | Mar. 6, 1956 |
| 2,744,422 | Finch | May 8, 1956 |
| 2,805,743 | Keese | Sept. 10, 1957 |